United States Patent
Park et al.

(10) Patent No.: US 10,988,036 B2
(45) Date of Patent: Apr. 27, 2021

(54) PROTECTIVE APPARATUS FOR HIGH VOLTAGE BATTERY OF VEHICLE

(71) Applicants: HYUNDAI MOTOR COMPANY, Seoul (KR); KIA MOTORS CORPORATION, Seoul (KR)

(72) Inventors: Hyun Wook Park, Daegu (KR); Seung Min Jeong, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 74 days.

(21) Appl. No.: 16/421,784

(22) Filed: May 24, 2019

(65) Prior Publication Data

US 2020/0254885 A1 Aug. 13, 2020

(30) Foreign Application Priority Data

Feb. 12, 2019 (KR) ........................ 10-2019-0016378

(51) Int. Cl.
| | |
|---|---|
| *B60L 50/64* | (2019.01) |
| *B62D 21/12* | (2006.01) |
| *B60L 50/60* | (2019.01) |
| *H01M 50/20* | (2021.01) |

(52) U.S. Cl.
CPC .............. *B60L 50/64* (2019.02); *B60L 50/66* (2019.02); *B62D 21/12* (2013.01); *H01M 50/20* (2021.01); *B60Y 2306/01* (2013.01)

(58) Field of Classification Search
CPC ......... B60L 50/64; B60L 50/66; B62D 21/12; H01M 2/1083; B60Y 2306/01
See application file for complete search history.

(56) References Cited

U.S. PATENT DOCUMENTS

| | | | |
|---|---|---|---|
| 3,347,501 A | 10/1967 | Van Eimeren | |
| 5,476,151 A | 12/1995 | Tsuchida et al. | |
| 6,394,215 B1 | 5/2002 | Masuda et al. | |
| 6,478,106 B2 | 11/2002 | Hawener et al. | |
| 7,610,978 B2 * | 11/2009 | Takasaki | B60L 50/64 180/68.5 |
| 7,921,951 B2 * | 4/2011 | Watanabe | B60L 50/66 180/68.5 |
| 8,079,435 B2 * | 12/2011 | Takasaki | B60K 1/04 180/68.5 |

(Continued)

FOREIGN PATENT DOCUMENTS

| | | |
|---|---|---|
| JP | H07-117725 A | 5/1995 |
| JP | 2019-130970 A | 8/2019 |

(Continued)

OTHER PUBLICATIONS

U.S. Non-Final Office Action dated Apr. 15, 2020 issued in U.S. Appl. No. 16/415,025.

*Primary Examiner* — Bryan A Evans
(74) *Attorney, Agent, or Firm* — Morgan, Lewis & Bockius LLP (57) ABSTRACT

The present disclosure relates to a protective apparatus for a high voltage battery of a vehicle, the protective apparatus capable of guiding downwards a movement path of a rear roll mounting bracket using a sliding prevention structure disposed in front of a high voltage battery, thereby preventing the damage and breakage of the high voltage battery due to the rear roll mounting bracket.

12 Claims, 7 Drawing Sheets

(56) References Cited

U.S. PATENT DOCUMENTS

| | | | |
|---|---|---|---|
| 8,276,698 B2 * | 10/2012 | Guss | B60K 1/04 |
| | | | 180/68.5 |
| 8,585,066 B2 | 11/2013 | Young et al. | |
| 8,794,646 B1 | 8/2014 | Onishi et al. | |
| 8,894,129 B2 | 11/2014 | Katou et al. | |
| 9,776,661 B2 | 10/2017 | Kaneko et al. | |
| 9,802,649 B2 | 10/2017 | Ewert et al. | |
| 9,809,101 B2 | 11/2017 | Ikeda et al. | |
| 9,889,886 B2 | 2/2018 | Murata et al. | |
| 9,914,480 B2 | 3/2018 | Taguchi | |
| 10,214,243 B2 | 2/2019 | Elbkaily et al. | |
| 10,494,030 B1 | 12/2019 | Paramasivam et al. | |
| 2015/0174996 A1 | 6/2015 | Ikeda et al. | |
| 2016/0207573 A1 | 7/2016 | Kitakata et al. | |
| 2019/0176891 A1 | 6/2019 | Sawatzki et al. | |
| 2020/0010123 A1 | 1/2020 | Fujii et al. | |

FOREIGN PATENT DOCUMENTS

| | | |
|---|---|---|
| KR | 10-2012-0081414 A | 7/2012 |
| KR | 10-2018-0128787 A | 12/2018 |

\* cited by examiner

FIG.7 front ←

10

US 10,988,036 B2

PROTECTIVE APPARATUS FOR HIGH VOLTAGE BATTERY OF VEHICLE

CROSS REFERENCE TO RELATED APPLICATION

The present application claims the benefit of priority to Korean Patent Application No. 10-2019-0016378, filed on Feb. 12, 2019 with the Korean Intellectual Property Office, the entire contents of which are incorporated herein by reference.

TECHNICAL FIELD

The present disclosure relates to a protective apparatus for a high voltage battery of a vehicle and, more particularly, to a technology for a protective apparatus for a high voltage battery of a vehicle, in which the protective apparatus is capable of preventing the high voltage battery from being damaged because of a rear roll mounting bracket in case of a collision accident.

BACKGROUND

In recent years, interest in environmentally friendly vehicles has been increasing due to environmental issues and high oil prices, and development of electric vehicles using electric energy as an environmentally friendly vehicle has accelerated.

An electric vehicle is a vehicle that uses an electric motor as a driving source, and is essentially equipped with a high-voltage battery that provides driving power to the electric motor.

An electric vehicle travelling range is usually determined by a capacity of the battery, and an external size of the battery is inevitably increased in order to increase the capacity of the battery.

In a case that the high voltage battery is mounted on a position below a center floor, it is necessary to increase the external size of the battery toward a forwards direction in order to meet a demand for an increase of the travelling range. As a result, a space between a front part of the high voltage battery and a rear part of a subframe is inevitably narrowed.

Meanwhile, the rear roll mounting bracket, with which the motor speed reducer assembly is coupled, is provided at the rear part of the subframe. When a collision accident occurs with a structure in which the space between the front part of the high voltage battery and the rear part of the subframe is narrow, as the subframe slides backwards, the rear roll mounting bracket hits the front part of the high voltage battery. As a result, a problem occurs that the front part of the high voltage battery is severely damaged by a blow of the rear roll mounting bracket.

It should be understood that the foregoing description of the background art is merely for the purpose of promoting an understanding of the background of the present disclosure and should not be construed as an admission that the description forms a related art known to those of ordinary skill in the art.

SUMMARY

Accordingly, the present disclosure has been made keeping in mind the above problems occurring in the related art, and the present disclosure is intended to propose a protective apparatus for a high voltage battery of a vehicle, wherein the protective apparatus is capable of eliminating a phenomenon that a rear roll mounting bracket hits a front part of the high voltage battery by guiding downwards a movement of the rear roll mounting bracket provided on a subframe in case of a collision accident. Thereby, the protective apparatus is capable of substantially preventing damage and breakage of the high voltage battery from occurring caused by the rear roll mounting bracket.

In order to achieve the above object, according to exemplary embodiments of the present disclosure, a protective apparatus for protecting a high voltage battery of a vehicle mounted on a position below a center floor of the vehicle may include a sliding prevention structure located in front of the high voltage battery, the sliding prevention structure configured to come into contact with a rear roll mounting bracket disposed on a subframe of the vehicle in case of a collision accident, and to restrain the subframe from sliding backwards when coming into contact with the rear roll mounting bracket.

The apparatus may further include a vehicle body cross member to which the sliding prevention structure is coupled, wherein the vehicle body cross member is coupled with a front floor of the vehicle, with left and right ends thereof connected to front side members of the vehicle, respectively.

The apparatus may further include a tunnel reinforcing panel connected to the vehicle body cross member, extending backwards, and coupled with the center floor.

In the apparatus, a portion where the vehicle body cross member and the tunnel reinforcing panel are connected to each other may be configured as a closed section having a closed space.

In the apparatus, the vehicle body cross member may include a plurality of member supports as an integrated structure, the plurality of member supports extending backwards and coupled with the center floor.

In the apparatus, the sliding prevention structure may include: a support portion having a box shape connected to the vehicle body cross member and protruding forwards; and a contact portion having a panel shape coupled with the support portion to cover a front surface of the support portion and coming into contact with the rear roll mounting bracket when the subframe slides backwards due to a collision accident.

In the apparatus a plurality of beads may be disposed at a portion where a bottom surface of the support portion and a lower end of the contact portion are connected to each other, such that the plurality of beads extend in a front-to-rear direction, wherein the plurality of beads may be configured to exert a supporting force to restrain the support portion from sliding backwards when the rear roll mounting bracket comes into contact with the contact portion.

In the apparatus, an engraved groove extending in a longitudinal direction may be disposed on each of both side surfaces of the support portion, wherein when a load greater than the supporting force of the plurality of beads is applied to the contact portion, the engraved groove induces deformation of the support portion so that the support portion slides backwards.

In the apparatus, a reinforcement structure of a closed section having a closed space may be disposed at the front portion of the high voltage battery, wherein the reinforcement structure connects left and right front ends of a battery case.

In the apparatus, a front surface of the reinforcement structure may be configured to be declined towards a rear of the vehicle so as to induce a downwards movement of the rear roll mounting bracket in case of a collision accident.

The protective apparatus for a high voltage battery of a vehicle according to exemplary embodiments of the present disclosure has a structure in which a sliding prevention structure is disposed on the front side of the high voltage battery. When a collision accident occurs, a movement path of the rear roll mounting bracket is guided downwards by the sliding prevention structure, whereby it is possible to prevent a phenomenon that the rear roll mounting bracket hits a front part of the high voltage battery. As a result, there is an effect of preventing damage and breakage of the high voltage battery caused by the rear roll mounting bracket.

BRIEF DESCRIPTION OF THE DRAWINGS

The above and other objects, features and other advantages of the present disclosure will be more clearly understood from the following detailed description when taken in conjunction with the accompanying drawings, in which.

It is to be understood that the appended drawings are not necessarily drawn to scale, and are presenting a somewhat simplified representation of various features illustrative of the basic principles of the disclosure. The specific design features of the present disclosure as disclosed herein, including, for example, specific dimensions, orientations, locations, and shapes, will be determined in part by the particularly intended application and use environment.

DETAILED DESCRIPTION

Hereinafter, a protective apparatus for a high voltage battery of a vehicle according to an exemplary embodiment of the present disclosure will be described with reference to the accompanying drawings.

In case of an electric vehicle, as shown in FIGS. 1 to 7, a subframe 10 is coupled with a vehicle body member 20 and installed on a lower portion of a front side, and a high voltage battery 40 is mounted on a position below a center floor 30 which is located behind the rear side of the subframe 10.

Figure 1:
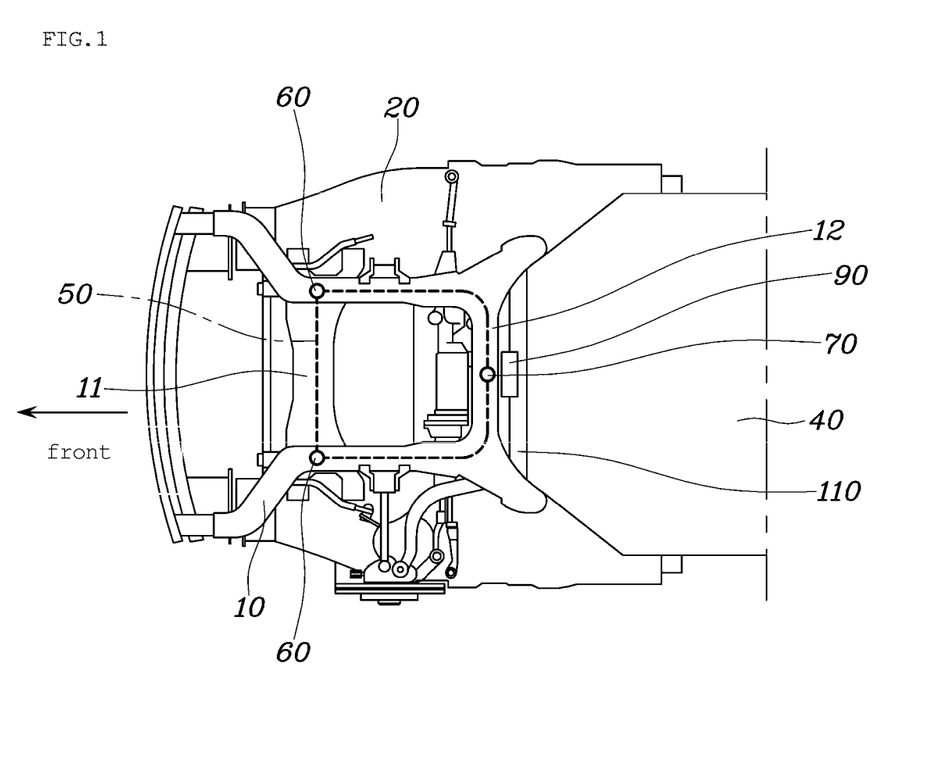
FIG. 1 is a bottom view of an electric vehicle provided with a protective apparatus for a high voltage battery of a vehicle according to an exemplary embodiment of the present disclosure.

A motor speed reducer assembly 50 is installed as a three-point support structure on the subframe 10, wherein the three-point support structure means a combined structure that is coupled with two front rolls 60 positioned on the front side of the subframe 10 and one rear roll 70 positioned on the rear side of the subframe 10.

That is, the front cross member 11 constituting the subframe 10 is provided with two front roll mounting brackets, the front rolls 60 are coupled with the two front roll mounting brackets, respectively, and the two front rolls 60 are coupled with a front side of the motor speed reducer assembly 50. In addition, a rear cross member 12 constituting the subframe 10 is provided with one rear roll mounting bracket 80, the rear roll 70 is coupled with the rear roll mounting bracket 80, and the one rear roll 70 is coupled with a rear side of the motor speed reducer assembly 50. Accordingly, the motor speed reducer assembly 50 is installed on the subframe 10 as a three-point support structure by a medium of the two front rolls 60 and the one rear roll 70.

Since the high voltage battery 40 is located behind the rear side of the rear roll mounting bracket 80 and a separation distance between the rear roll mounting bracket 80 and the high voltage battery 40 is narrow, the rear roll mounting bracket 80 hits the front part of the high voltage battery 40 due to the subframe 10 sliding backwards in case of a collision accident, thereby inducing a problem that the high voltage battery 40 is damaged and broken. In this regard, according to an exemplary embodiment of the present disclosure, the protective apparatus is characterized to have a structure capable of preventing damage and breakage of the high voltage battery 40 induced by the rear roll mounting bracket 80 from occurring in case of the collision accident.

Figure 2:
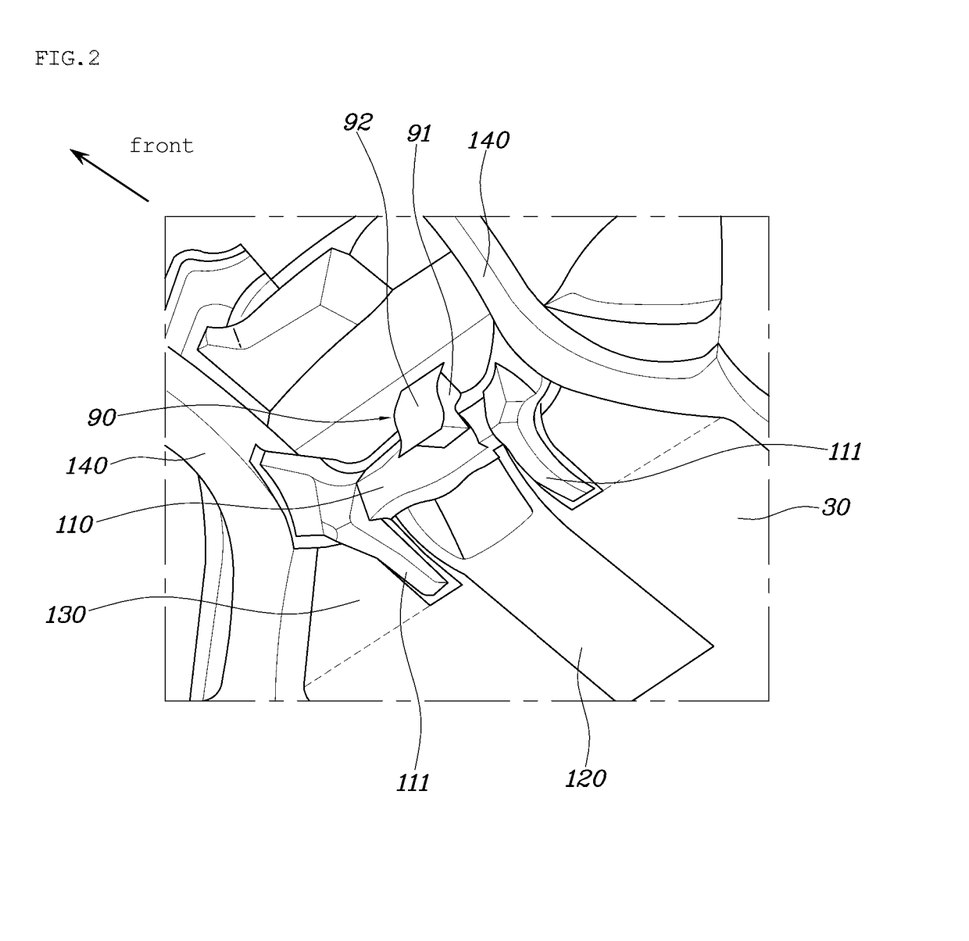
FIG. 2 is a view of the lower part of a vehicle in which a sliding prevention structure according to an exemplary embodiment of the present disclosure is installed.

That is, according to an exemplary embodiment of the present disclosure, the protective apparatus includes a sliding prevention structure 90 located in front of the high voltage battery 40, coming into contact with the rear roll mounting bracket 80 provided on the subframe 10 in case of a collision accident, and restraining the subframe 10 from sliding backwards.

When the subframe 10 slides backwards in case of a collision accident, the rear roll mounting bracket 80 provided on the rear of the subframe 10 slides backwards together. At this time, the rear roll mounting bracket 80 comes into contact with the sliding prevention structure 90, thereby enabling the subframe 10 to be substantially restrained from sliding backwards.

Figure 3:
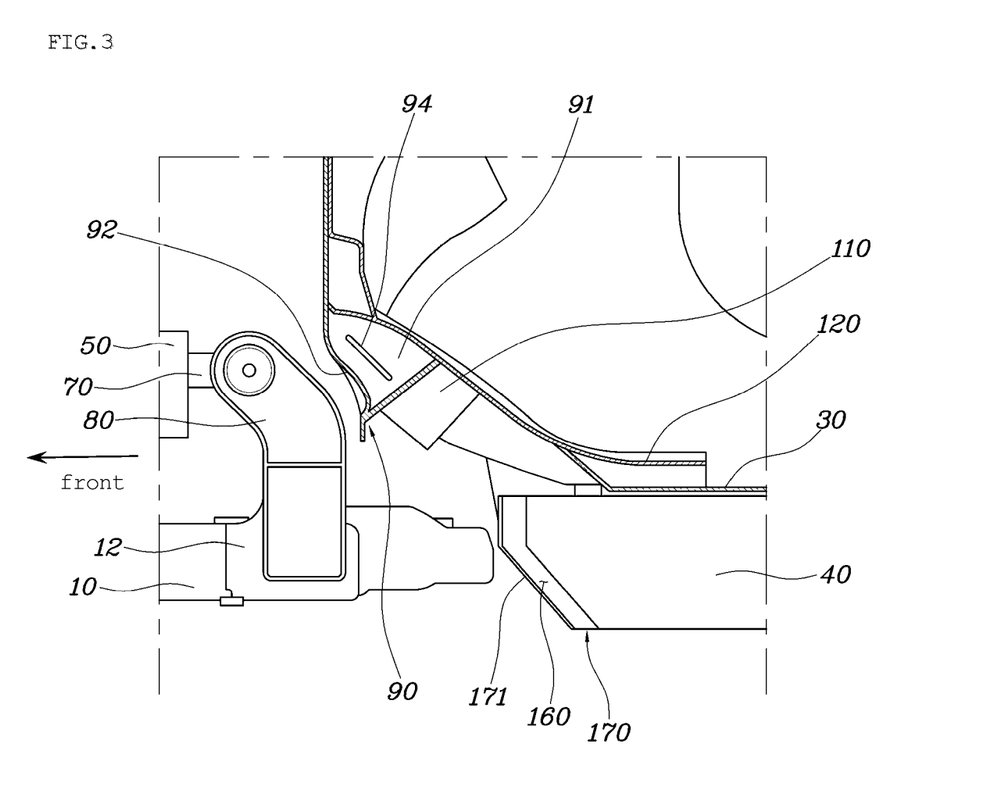
FIGS. 3 and 4 are a sectional view and a perspective view, respectively, of a part in FIG. 1 where a sliding prevention structure is installed.
Figure 4:
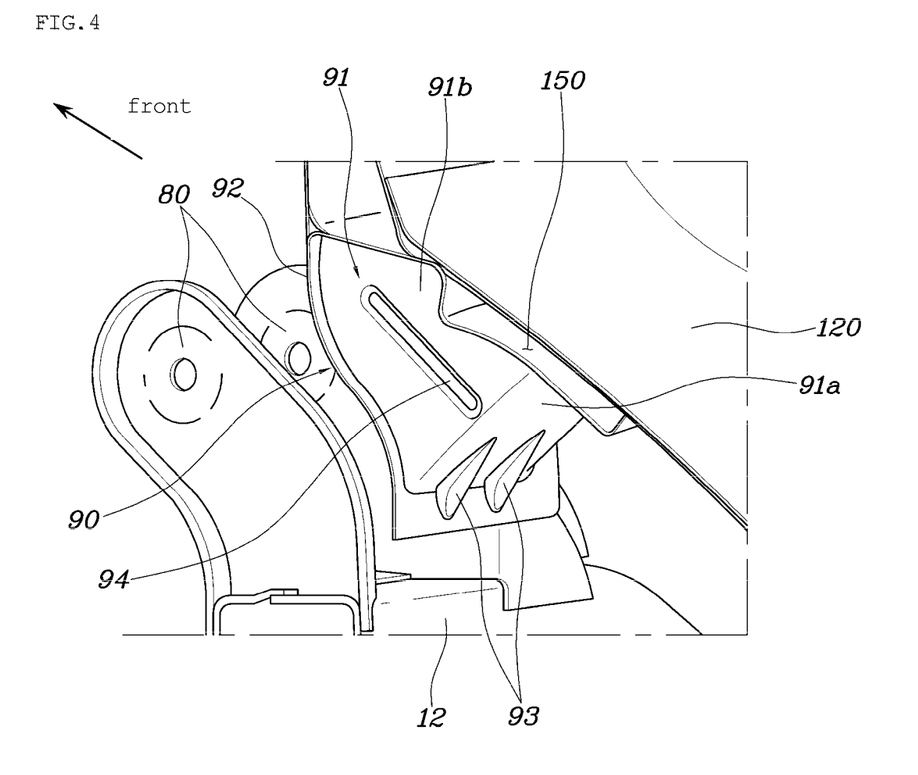

In addition, according to an exemplary embodiment of the present disclosure, the protective apparatus further includes a vehicle body cross member 110 with which the sliding prevention structure 90 is coupled; and a tunnel reinforcing panel 120 connected to the vehicle body cross member 110, extending backwards, and coupled with a center floor 30.

The vehicle body cross member 110 is coupled with a front floor 130 of the vehicle, with left and right ends thereof coupled with front side members 140, respectively.

According to an exemplary embodiment of the present disclosure, the vehicle body cross member 110 and front side members 140 may be a beam structure of the vehicle.

When the subframe 10 slides backwards due to a collision accident, and the rear roll mounting bracket 80 hits the sliding prevention structure 90 by coming into contact therewith, collision energy generated in the sliding prevention structure 90 is transmitted and dispersed to the front side members 140 through the vehicle body cross member 110. In addition, the collision energy generated above is transmitted and dispersed toward the center floor 30 through the tunnel reinforcing panel 120. Accordingly, durability of the protective apparatus is improved through effective dispersion of the collision energy.

Meanwhile, the portion where the vehicle body cross member 110 and the tunnel reinforcing panel 120 are connected to each other is connected to the closed section having a closed space 150, whereby a more robust structure against collision energy may be provided through the closed space 150 of the closed section.

A plurality of member supports 111 extending backwards and coupled with the center floor 30 is integrally formed with the vehicle body cross member 110.

The plurality of member supports 111 is installed in parallel with the tunnel reinforcing panel 120 at the left and right sides of the tunnel reinforcing panel 120. Here, the plurality of member supports 111 plays a role to transmit and disperse collision energy, which is transferred to the vehicle body cross member 110 when a collision accident occurs, toward the center floor 30, thereby improving the durability of the protective apparatus.

The sliding prevention structure 90 includes a support portion 91 having a box shape connected to the vehicle body cross member 110, and protruding forwards; and a contact portion 92 having a panel shape coupled with the support portion 91 to cover the front surface thereof, and coming into contact with the rear roll mounting bracket 80 when the subframe 10 slides backwards due to a collision accident.

Here, a plurality of beads 93 is provided at a portion where a bottom surface 91a of the support portion 91 and a lower end of the contact portion 92 are connected to each other, such that the beads extend in a front to rear direction. The beads 93 play a role to exert a supporting force to restrain the support portion 91 from sliding backwards when the rear roll mounting bracket 80 comes into contact with the contact portion 92 due to a collision accident. Thereby, a phenomenon that the rear roll mounting bracket 80 hits the front part of the high voltage battery 40 may be prevented from occurring.

In addition, an engraved groove 94 extending in a longitudinal direction is formed on each of both side surfaces 91b of the support portion 91. Here, the engraved groove 94 plays a role to induce deformation of the support portion 91 so that the support portion 91 may slide backwards through a collapse thereof when a load greater than the supporting force of the beads 93 is input through the contact portion 92. Thereby, the support portion 91 may absorb collision energy more effectively.

Figure 5:
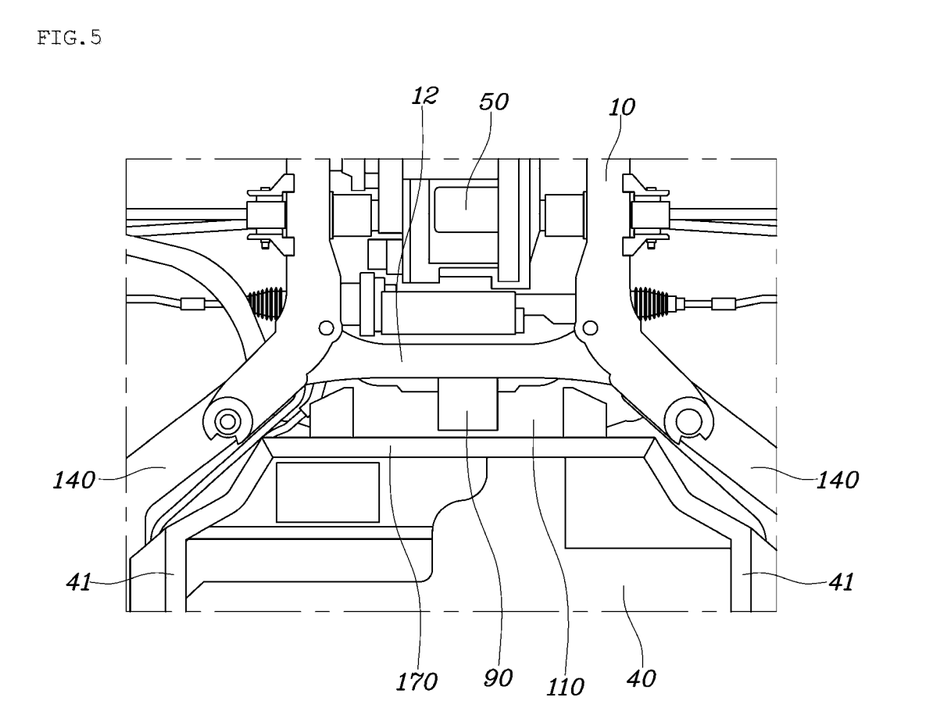
FIG. 5 is a view of the lower part of a vehicle for explaining a reinforcement structure according to an exemplary embodiment of the present disclosure.

In addition, according to an exemplary embodiment of the present disclosure, the high voltage battery 40 is provided with a reinforcement structure 170 of a closed section having a closed space 160 therein and positioned at a front portion of the high voltage battery 40. Here, the reinforcement structure 170 is disposed in a lateral direction and constituted to allow both of left and right ends thereof to connect left and right front ends of the battery case 41 constituting the high voltage battery 40 thereto, respectively.

The front portion of the high voltage battery 40 may be provided with a stronger structure against collision energy through the reinforcement structure 170 of the closed section having the closed space 160.

In addition, the front surface 171 of the reinforcement structure 170 is formed to be declined towards a rear of the vehicle so as to induce a downwards movement of the rear roll mounting bracket 80 in case of a collision accident. Thereby, a phenomenon that the rear roll mounting bracket 80 directly hits the front part of the high voltage battery 40 may be prevented from occurring in case of a collision accident.

Hereinafter, implementation and effects of exemplary embodiments of the present disclosure will be described.

Figure 6:
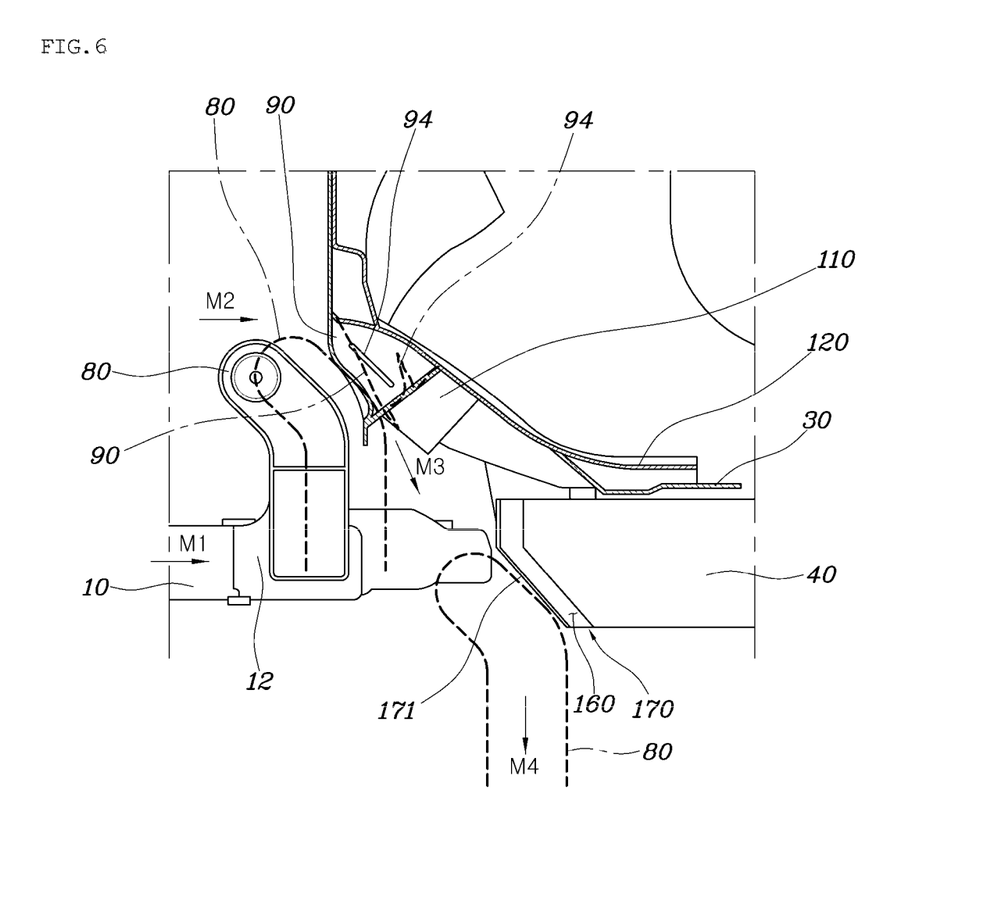
FIGS. 6 and 7 are illustrative views for showing an operating state in case of a collision accident.

When a collision accident occurs during driving, the subframe 10 slides backwards (an arrow M1 in FIG. 6). Then, the rear roll mounting bracket 80 provided on the subframe 10 also slides backwards together with the subframe 10 (an arrow M2). At this time, the rear roll mounting bracket 80 comes into contact with and hits the contact portion 92 of the sliding prevention structure 90.

When the rear roll mounting bracket 80 hits the sliding prevention structure 90, collision energy generated in the sliding prevention structure 90 is transmitted and dispersed to the front side members 140 through the vehicle body cross member 110, also transmitted and dispersed toward the center floor 30 through the tunnel reinforcing panel 120, and also transmitted and dispersed toward the center floor 30 through the plurality of member supports 111. Accordingly, durability of the protective apparatus is improved through effective dispersion of the collision energy.

In addition, supporting force may be exerted against the collision energy through the closed space 150 of the closed section formed at a portion where the vehicle body cross member 110 and the tunnel reinforcing panel 120 are connected to each other. Thereby, it is possible to prevent the abrupt collapse of the vehicle body cross member 110, thereby allowing the durability of the protective apparatus to be improved.

Figure 7:
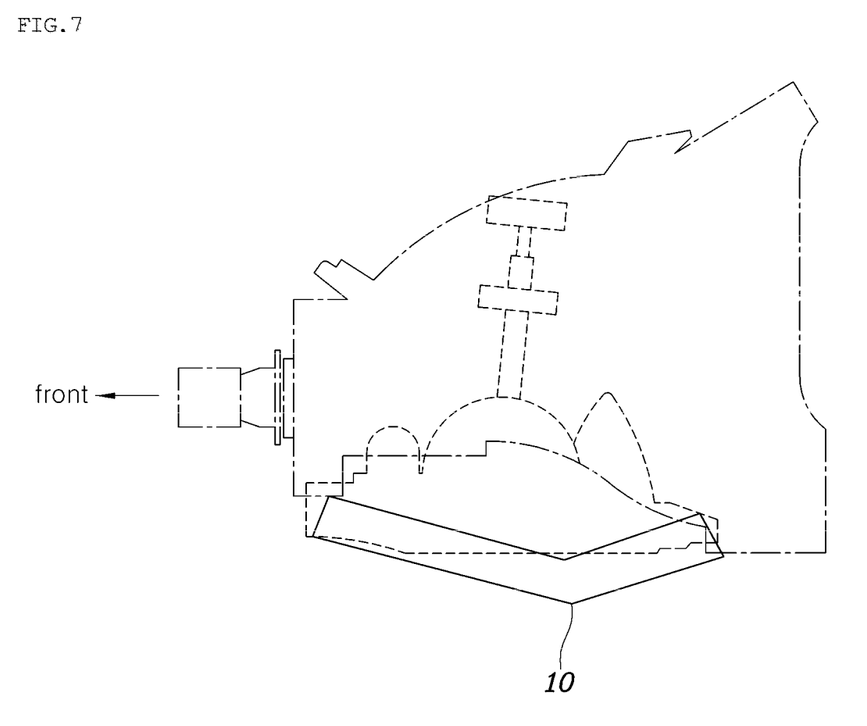

When the rear roll mounting bracket 80 hits the sliding prevention structure 90, the support portion 91 having a box shape and the plurality of beads 93 exert a supporting force against collision energy, thereby preventing a phenomenon of an abrupt collapse of the support portion 91 from occurring. In addition, while the support portion 91 and the beads 93 exert the supporting force, the subframe 10 reduces the collision energy, with shear deformation thereof occurring as shown in FIG. 7.

However, when the collision energy is excessive, the subframe 10 continuously slides backwards even if shear deformation of the subframe 10 occurred. Thereby, as a load greater than the supporting force of the beads 93 is input to the sliding prevention structure 90 through the rear roll mounting bracket 80 that has come into contact with the contact portion 92, deformation of the sliding prevention structure 90 occurs. That is, collapsed with the engraved groove 94 as a reference, the support portion 91 slides backwards.

When the support portion 91 is deformed by the engraved groove 94 as described above, collision energy may be more effectively absorbed through the deformation of the support portion 91. In particular, when the support portion 91 is deformed, the movement path of the rear roll mounting bracket 80 having been come into contact with the contact portion 92 may be guided downwards as directed by an arrow M3 in FIG. 6. Accordingly, a phenomenon that the rear roll mounting bracket 80 hits the front part of the high voltage battery 40 may be prevented from occurring. Thereby, it is possible to prevent damage and breakage of the high voltage battery 40 induced by the rear roll mounting bracket 80.

In addition, there may occur a phenomenon that the rear roll mounting bracket 80 moving downwards due to the deformation of the support portion 91 comes into contact with the reinforcement structure 170. However, it is possible to exert the supporting force against collision energy by the reinforcement structure 170 having a closed space 160 of the closed section, whereby a phenomenon that the rear roll mounting bracket 80 directly hits the front part of the high voltage battery 40 may be prevented from occurring.

In addition, since the front surface 171 of the reinforcement structure 170 is declined towards a rear of the vehicle, the movement path of the rear roll mounting bracket 80 may be guided downwards again (an arrow M4 in FIG. 6). Thereby, additionally, a phenomenon that the rear roll mounting bracket 80 directly hits a front part of the high voltage battery 40 may be further prevented from occurring.

As described above, according to an exemplary embodiment of the present disclosure, the movement path of the rear roll mounting bracket 80 may be guided downwards in case of a collision accident using the sliding prevention structure 90 disposed in front of the high voltage battery 40.

Thereby, a phenomenon that the rear roll mounting bracket 80 hits the front part of the high voltage battery 40 may be prevented from occurring. As a result, there is an advantage that damage and breakage of the high voltage battery 40 induced by the rear roll mounting bracket 80 may be prevented.

While the present disclosure has been particularly shown and described with reference to the specific embodiments thereof, it will be apparent to those of ordinary skill in the art that various changes in form and details may be made therein without departing from the spirit and scope of the invention as defined by the following claims.

What is claimed is:

1. A protective apparatus for a high voltage battery of a vehicle, wherein the apparatus for protecting the high voltage battery mounted on a position below a center floor of the vehicle comprises:
   a sliding prevention structure located in front of the high voltage battery, the sliding prevention structure configured to come into contact with a rear roll mounting bracket disposed on a subframe of the vehicle in case of a collision accident, and to restrain the subframe from sliding backwards when coming into contact with the rear roll mounting bracket,
   a vehicle body cross member to which the sliding prevention structure is coupled; and
   a tunnel reinforcing panel connected to the vehicle body cross member, extending backwards, and coupled with the center floor,
   wherein the vehicle body cross member is coupled with a front floor of the vehicle, with left and right ends thereof connected to front side members of the vehicle, respectively.

2. The apparatus of claim 1, wherein a portion where the vehicle body cross member and the tunnel reinforcing panel are connected to each other is configured as a closed section having a closed space.

3. The apparatus of claim 1, wherein the vehicle body cross member includes a plurality of member supports as an integrated structure, the plurality of member supports extending backwards and coupled with the center floor.

4. The apparatus of claim 1, wherein the sliding prevention structure includes:
   a support portion having a box shape connected to the vehicle body cross member and protruding forwards; and
   a contact portion having a panel shape coupled with the support portion to cover a front surface of the support portion and coming into contact with the rear roll mounting bracket when the subframe slides backwards due to a collision accident.

5. The apparatus of claim 4, wherein a plurality of beads are disposed at a portion where a bottom surface of the support portion and a lower end of the contact portion are connected to each other, such that the plurality of beads extend in a front-to-rear direction, and
   wherein the plurality of beads exert a supporting force to restrain the support portion from sliding backwards when the rear roll mounting bracket comes into contact with the contact portion.

6. The apparatus of claim 5, wherein an engraved groove extending in a longitudinal direction is disposed on each of both side surfaces of the support portion, and
   wherein when a load greater than the supporting force of the plurality of beads is applied to the contact portion, the engraved groove induces deformation of the support portion so that the support portion slides backwards.

7. The apparatus of claim 1, wherein a reinforcement structure of a closed section having a closed space is disposed at a front portion of the high voltage battery, and
   wherein the reinforcement structure connects left and right front ends of a battery case.

8. The apparatus of claim 7, wherein a front surface of the reinforcement structure is configured to be declined towards a rear of the vehicle so as to induce a downwards movement of the rear roll mounting bracket in case of a collision accident.

9. A protective apparatus for a high voltage battery of a vehicle, wherein the apparatus for protecting the high voltage battery mounted on a position below a center floor of the vehicle comprises:
   a sliding prevention structure located in front of the high voltage battery, the sliding prevention structure configured to come into contact with a rear roll mounting bracket disposed on a subframe of the vehicle in case of a collision accident, and to restrain the subframe from sliding backwards when coming into contact with the rear roll mounting bracket; and
   a vehicle body cross member to which the sliding prevention structure is coupled,
   wherein the vehicle body cross member is coupled with a front floor of the vehicle, with left and right ends thereof connected to front side members of the vehicle, respectively, and
   wherein the sliding prevention structure includes:
   a support portion having a box shape connected to the vehicle body cross member and protruding forwards; and
   a contact portion having a panel shape coupled with the support portion to cover a front surface of the support portion and coming into contact with the rear roll mounting bracket when the subframe slides backwards due to a collision accident.

10. The apparatus of claim 9, wherein a plurality of beads are disposed at a portion where a bottom surface of the support portion and a lower end of the contact portion are connected to each other, such that the plurality of beads extend in a front-to-rear direction, and
    wherein the plurality of beads exert a supporting force to restrain the support portion from sliding backwards when the rear roll mounting bracket comes into contact with the contact portion.

11. The apparatus of claim 10, wherein an engraved groove extending in a longitudinal direction is disposed on each of both side surfaces of the support portion, and
    wherein when a load greater than the supporting force of the plurality of beads is applied to the contact portion, the engraved groove induces deformation of the support portion so that the support portion slides backwards.

12. A protective apparatus for a high voltage battery of a vehicle, wherein the apparatus for protecting the high voltage battery mounted on a position below a center floor of the vehicle comprises:
    a sliding prevention structure located in front of the high voltage battery, the sliding prevention structure configured to come into contact with a rear roll mounting bracket disposed on a subframe of the vehicle in case of a collision accident, and to restrain the subframe from sliding backwards when coming into contact with the rear roll mounting bracket, wherein a reinforcement structure of a closed section having a closed space is disposed at a front portion of the high voltage battery,
wherein the reinforcement structure connects left and right front ends of a battery case, and
wherein a front surface of the reinforcement structure is configured to be declined towards a rear of the vehicle so as to induce a downwards movement of the rear roll mounting bracket in case of a collision accident.

* * * * *